E. McC. SCOVILLE.
VALVE.
APPLICATION FILED SEPT. 6, 1917.
Reissued Jan. 22, 1918. 14,424.
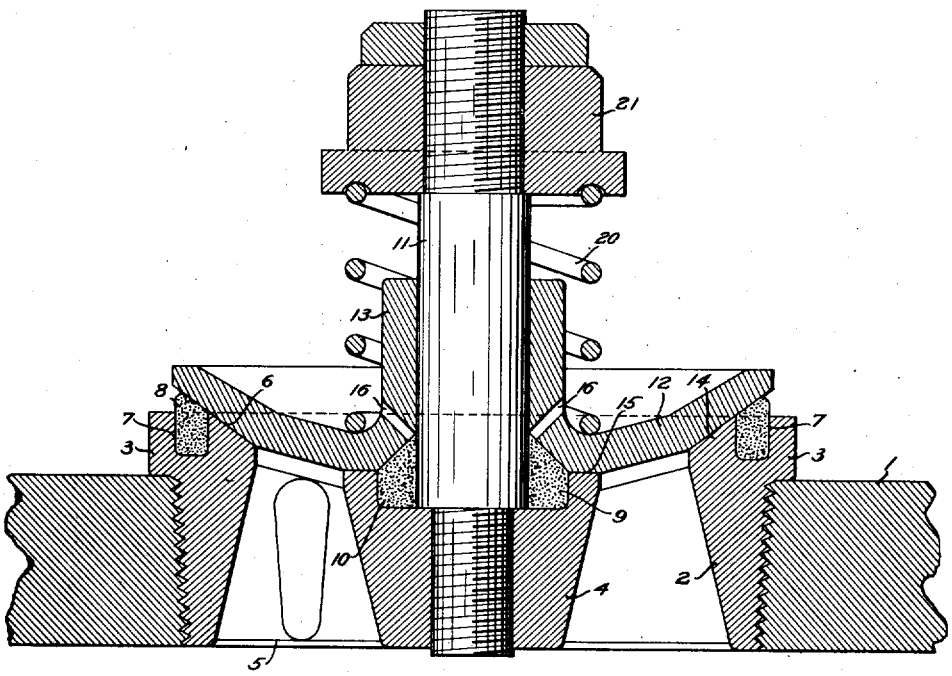
Inventor
E. M. Scoville
By G. F. Gilbert
Attorney

UNITED STATES PATENT OFFICE.

EUGENE McCLELLAN SCOVILLE, OF DADE CITY, FLORIDA, ASSIGNOR TO SCOVILLE PUMP VALVE COMPANY, OF CHICAGO, ILLINOIS, A CORPORATION OF ILLINOIS.

VALVE.

14,424. Specification of Reissued Letters Patent. Reissued Jan. 22, 1918.

Original No. 1,191,481, dated July 18, 1916, Serial No. 66,180, filed December 10, 1915. Application for reissue filed September 6, 1917. Serial No. 190,691.

*To all whom it may concern:*

Be it known that I, EUGENE M. SCOVILLE, a citizen of the United States, formerly residing at Waipahu, county of Honolulu, Territory of Hawaii, but now residing at Dade City, Florida, have invented certain new and useful Improvements in Valves; and I do hereby declare the following to be a full, clear, and exact description of the invention, such as will enable others skilled in the art to which it appertains to make and use the same.

The invention relates to certain new and useful improvements in valves of the type disclosed in Letters Patent of the United States, No. 1,161,257, granted to me under date of November 23, 1915, and has for its object to provide a valve of the character described therein, with means to flush the inner sealing gasket to free the same of dirt, grit, oil and the like, which tends to accumulate thereon; to so construct the valve and its seat that the structure affords the least impedance to the flow of liquid therethrough, thereby eliminating interference with the flow from adjacent valves, as well as the violent surging and shocks incident to the old forms of valves similarly employed, and furthermore, causes the valve disk to accurately center upon its seat, thereby obviating any tendency of the valve to ride or impinge upon the sealing gaskets, whereby the life of the valve and its accessories is materially prolonged and the efficiency of the apparatus to which it is applied is largely increased.

In the accompanying drawing, there is illustrated in sectional elevation, a pump valve embodying the invention.

Referring to the drawings, 1 indicates the valve deck of the pump, which is adapted to receive one or more of the valves to permit the fluid to pass at each power stroke of the pump, as will be understood. Seated in an appropriate screw-threaded opening in the valve deck is a valve seat thimble or ring 2, having a marginal rim or flange 3 and a central hub 4, which latter is connected to the main body portion 2 by means of suitable webs 5. The interior peripheral edge of the flange or rim 3 is beveled or inclined toward the center to afford an outer seating area for the valve disk, and adjacent to and exteriorly of the bevel seat 6, the rim 3 is provided with a peripheral groove 7, in which there is mounted a sealing gasket 8, of yielding or flexible material, which projects from the valve seat thimble or ring 2 to provide a stubby packing portion in the form of a cantaliver and which, like the similar ring in the patent aforesaid is normally out of pressure engagement with the valve disks, but is adapted to be forced by the pressure of the fluid, against the valve when the fluid attempts to escape through the joint between the valve and the seat.

The hub portion 4 is likewise provided with a threaded socket adapted to receive the threaded end of the valve stem or spindle 11, and surrounding said spindle and formed in the hub, is a recess 10 adapted to similarly receive and have projecting therefrom an inner sealing gasket or ring 9 of flexible or compressible material, which is adapted to form a seal between the adjacent parts of the valve disk and the hub, by the pressure of the fluid which forces the gasket against the adjacent parts of the valve and hub respectively.

Slidably mounted upon the spindle 11 is a valve disk or member 12 having a hub portion 13, the main body portion having a generally dish shape involving a substantially flat seating area 15, which engages a correspondingly formed area on the hub 4 and a peripheral beveled portion 14, which engages and coöperates with the beveled seat area 6, thereby producing two metal to metal seating areas between the valve and its seat. The valve is normally held to its seat by means of a helical spring 20, surrounding the hub 13 and the spindle 11 and held in place by means of a suitable lock nut 21.

The valve proper is provided with a series of openings 16, preferably located adjacent the junction of the hub and disk portion thereof, and therefore adjacent to the sealing ring 9 in the hub 4 which, when the valve is closed, admits the fluid pressure on the rear side thereof to the sealing gasket 9 to force the latter into intimate engagement with the adjacent portions of the valve, and when the valve is open to afford and induce a flow of fluid over the face of the sealing gasket 9 to free the latter of dirt, grit, oil and the like, which tends to accumulate thereon, so that damage to the sealing gasket and the seating areas between the valve and the hub 4 is practically obviated and the life of the valve thereby greatly prolonged.

The peculiar flaring or general dish-shape of the operative face of the valve 12, in conjunction with the beveled form of the outer seating area 6, that is, the outer portion of this operative face of the valve 12 being continuous with the seating (the joint between the valve and the seat), permits the fluid to pass through the valve with the least possible change in the direction of flow, thereby avoiding interference with or from the fluid passing through adjacent valves, and also avoiding the tendency of the fluid to violently impinge against the walls of the pump chamber, which frequently results in corrosion and pitting of the same, especially where the fluid is acid in character. The particular relation between the beveled engaging faces of the valve and its seat, also insures an accurate centering of the valve at all times, thereby preventing the valve riding upon or impinging against the sealing gaskets, which action would tend to distort and damage the gaskets and prevent their proper functioning.

Valves of the type described under actual service conditions are found to eliminate practically all of the hydraulic shocks and surging incident to the old types, which are injurious to the pump and its fittings. Furthermore, by actual test, it has been demonstrated that the particular form of valve will pass the same quantity of fluid with 40% less lift than the ordinary valve, so that the pump operates smoothly and quietly without any of the usual hydraulic shocks and water hammer in the discharge line.

While the invention has been illustrated as applied to pump check valves, it will be understood it is not limited to this particular use, but may be applied to valves of various types without departing from the spirit of the invention.

What I claim is:—

1. A valve device comprising a valve seat having central and peripheral seating areas, a valve adapted to directly engage said areas, and a gasket of compressible material associated with the central seating area and adapted to be forced by fluid pressure against the valve, said valve having openings therethrough adjacent said gasket to induce a flow of fluid over the gasket and adjacent seating area to clean the same when the valve is open.

2. A valve device comprising a valve seat having central and peripheral seating areas, a valve adapted to directly engage said areas, and gaskets of compressible material associated with the central and peripheral seating areas and adapted to be forced by the fluid pressure against the valve, said valve having openings therethrough adjacent the inner gasket to induce a flow of fluid over the gasket and adjacent seating area to clean the same when the valve is open.

3. A valve device comprising a valve seat having a central seating area and a beveled peripheral seating area, a valve having a generally dish-shaped face adapted to directly engage said areas, and a gasket of compressible material positioned within a recess adjacent the central seating area and adapted to be forced by the fluid pressure against the valve, said valve having openings therethrough adjacent said gasket to induce a flow of fluid over the gasket and the adjacent seating area to clean the same when the valve is open.

4. A valve device comprising a valve seat having a central seating area and a beveled peripheral seating area, a valve having a generally dish-shaped face adapted to directly engage said areas, and gaskets of compressible material positioned in recesses adjacent the central and peripheral seating areas and adapted to be forced by the fluid pressure against the valve, said valve having openings therethrough adjacent the inner gasket to induce a flow of fluid over the gasket and the adjacent seating area to clean the same when the valve is open.

5. A valve device comprising a valve seat having a rim and a central hub, a beveled seating area on the rim, a seating area on the hub, a valve having a generally dish-shaped face adapted to directly engage said areas, and flexible gaskets positioned in recesses adjacent the seating areas and adapted to be forced by the flow of fluid pressure against the valve, said valve having openings therethrough adjacent the gasket carried by the hub to induce a flow of fluid over the gasket and adjacent seating area to clean the same when the valve is open.

6. A valve comprising two parts, a valve seat and a valve adapted to seat directly on said seat, one of said parts having a surface continuous with the seating and the other of said parts having another surface at an angle to said seating, and a ring of yielding material mounted on said other of said parts at said surface to provide a stubby packing portion in the form of a cantaliver projecting from said part and adapted to be forced against said surface of said first part by the pressure of the fluid in opposition to said cantaliver when the fluid attempts to escape by the valve but so positioned that it will not be displaced by said first part.

7. A valve comprising two parts, a beveled valve seat and a valve having an operative face of flaring shape adapted to seat directly on said seat, and a ring of yielding material mounted on said seat to provide a stubby packing portion in the form of a cantaliver projecting from said seat and adapted to be forced against said operative face of said valve by the pressure of the fluid in opposition to said cantaliver when the fluid attempts to escape by the valve but so positioned that it will not be displaced by said valve.

In testimony whereof I affix my signature, in presence of two witnesses.

EUGENE McCLELLAN SCOVILLE.

Witnesses:

A. G. KNIGHT,

OTTO WETTSTEIN, Jr.